United States Patent [19]

Bugnone

[11] 4,216,676
[45] Aug. 12, 1980

[54] APPARATUS FOR THE TESTING OF PRINTING OR LIKE CYLINDERS FOR OPERATING ON WEB MATERIAL

[76] Inventor: Aldo Bugnone, Via Bellini 2, Turin, Italy

[21] Appl. No.: 924,590

[22] Filed: Jul. 14, 1978

[30] Foreign Application Priority Data

Dec. 15, 1977 [IT] Italy .............................. 69805 A/77

[51] Int. Cl.² ............................................ G01N 19/00
[52] U.S. Cl. ............................. 73/432 R; 73/432 SD; 101/1
[58] Field of Search ...................... 73/432 R, 432 SD; 101/1, 426, 212, 219, 228; 364/578

[56] References Cited

U.S. PATENT DOCUMENTS

| 2,076,095 | 4/1937 | Rolls | 73/432 R X |
| 2,321,140 | 6/1943 | Grupe | 101/219 |
| 3,827,358 | 8/1974 | Budai | 101/228 |
| 4,003,311 | 1/1977 | Bardin | 101/426 |

OTHER PUBLICATIONS

Durrant, W. et al., *Machine Printing*, The Library of Printing Technology, Hastings House, Pub. N.Y., N.Y., 1973, p. 1–2.

*Primary Examiner*—Donald Watkins
*Assistant Examiner*—Joseph W. Roskos
*Attorney, Agent, or Firm*—Sughrue, Rothwell, Mion, Zinn and Macpeak

[57] ABSTRACT

Apparatus for testing a printing or other roller for a printing machine has a framework in which the roller is supported in cooperation with a counter-pressure roller which is interchangeable in the framework to enable the cylinder to be tested before installation in a machine. A web is fed to the nip of the cylinder and the pressure roller over a table upon which the web may be braked by, for example, suction applied through the table. The test apparatus includes tools for treatment of the web, the treated web being withdrawn by a discharge conveyor which is driven at a greater speed than the peripheral speeds of the cylinder and the counter-pressure roller.

18 Claims, 4 Drawing Figures

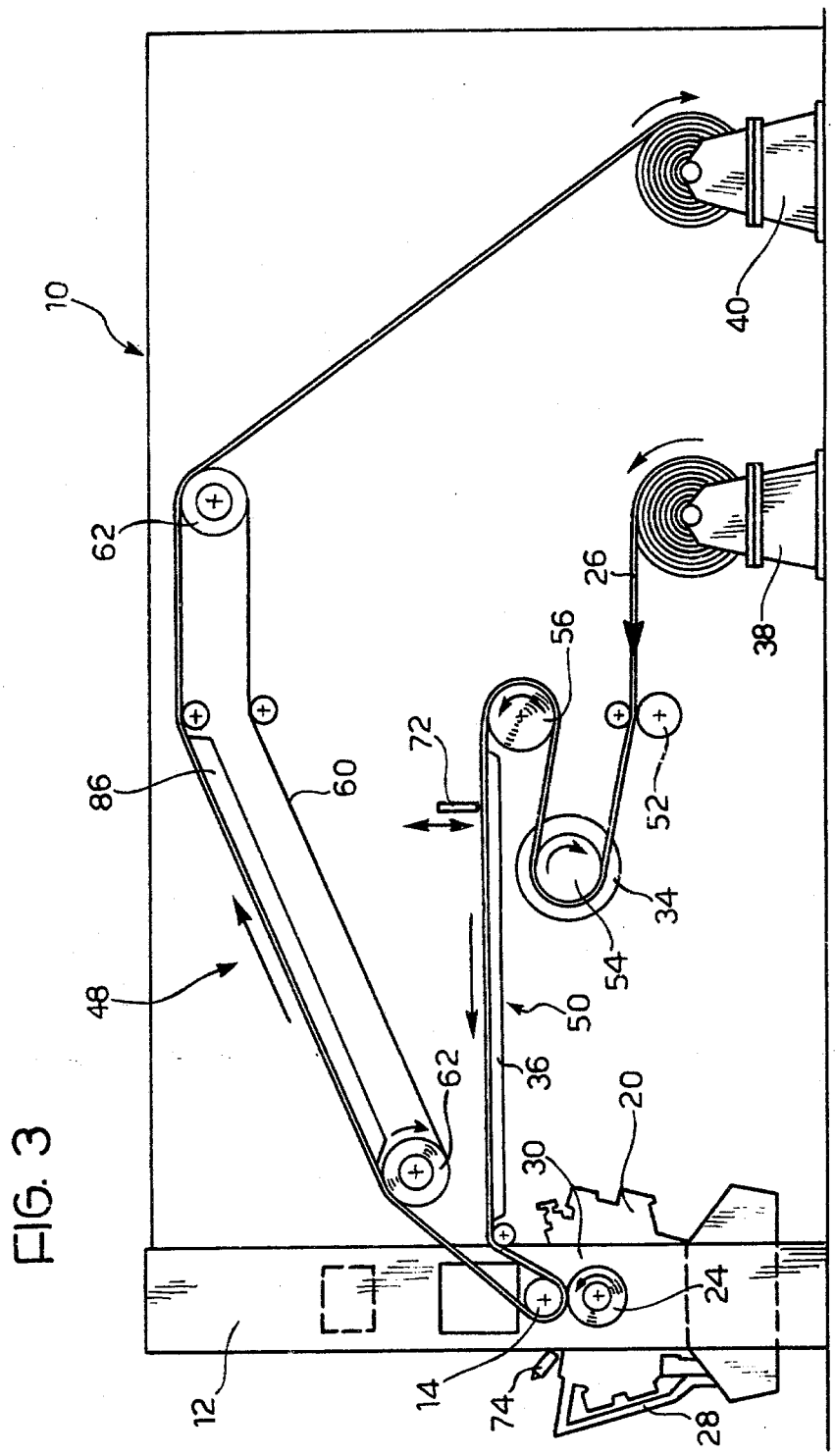

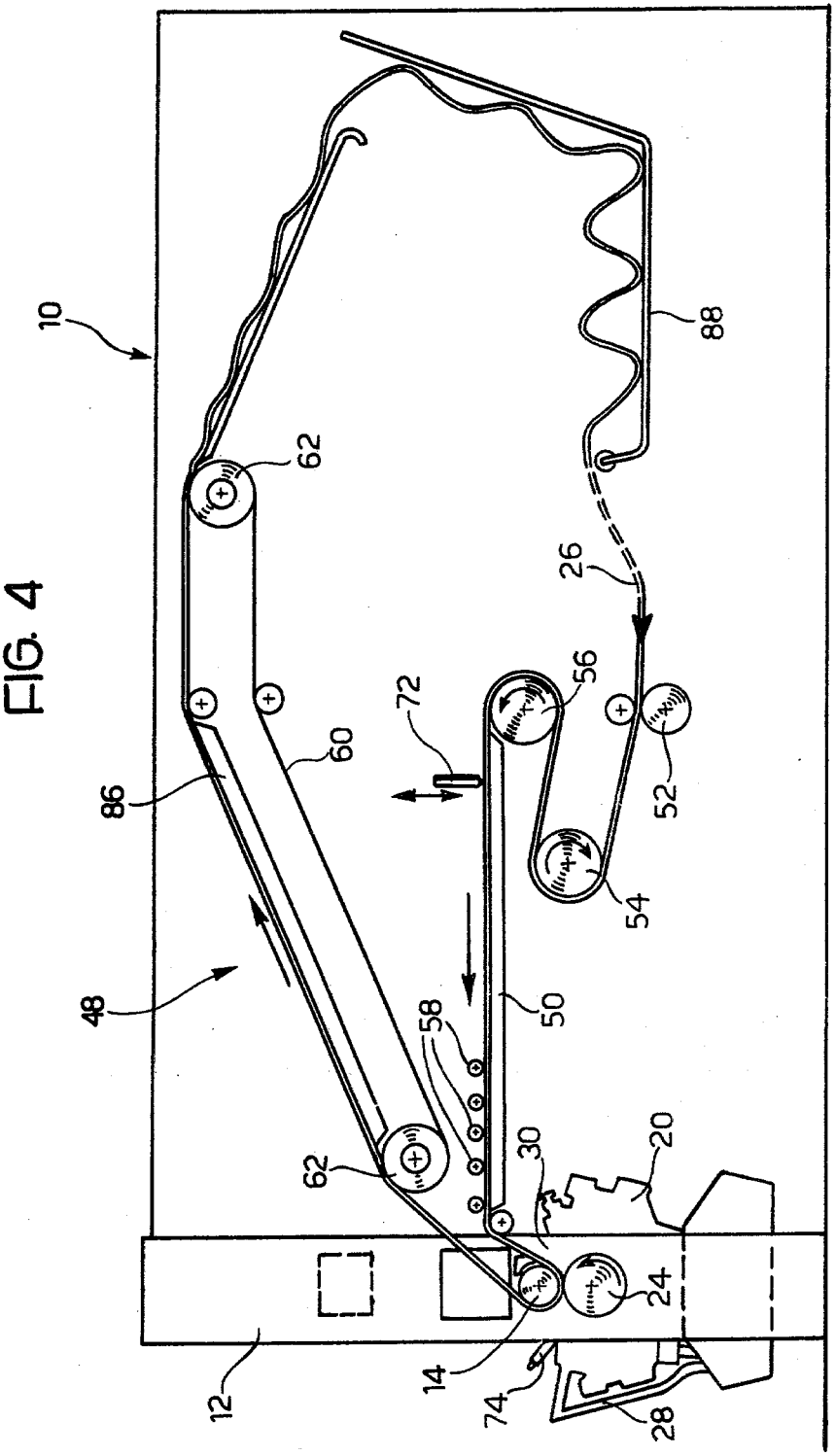

APPARATUS FOR THE TESTING OF PRINTING OR LIKE CYLINDERS FOR OPERATING ON WEB MATERIAL

The present invention relates to apparatus for the testing of printing cylinders or similar cylinders for operating on web material.

More particularly, the invention concerns apparatus as aforesaid which include means for supporting the cylinder for engagement with a counter-pressure roller mounted rotatably in a supporting framework of the machine, which is also provided with means to transport the web material and with tools for the treatment of the said web material.

In traditional apparatus for the testing of printing cylinders, such as rotogravure and flexographic printing cylinders, the cylinders are tested individually, with a series of long and tedious operations, before being mounted on the printing machine itself or on a carriage for mounting on the printing machine.

According to the prior art method of testing, the printing cylinder is mounted in a proof press, a test is made, and the cylinder is cleaned and demounted before being mounted on a cylinder support carriage or directly in a printing machine. The reliability of the tests thus performed is very approximate, in that the apparatus and fittings for the inking of the printing cylinder in the proof press are not the same as those of the printing machine itself. Consequently, the results of the proof printing will not in general correspond to what has been planned and tested, for example because the counter-pressure roller of the proof press has a diameter and hardness which differ from that of the printing machine itself and because the doctor blades are differently designed and operate at different pressures and angles.

In printing machines in which the printing cylinders are carried on mobile and interchangeable carriages, it will be understood that a further disadvantage of the prior art testing method is that on a press for a colour printing machine the colour pump may not be operational, splash guards may not be correctly set, and filters may not be in a suitable condition. That is, there may be imperfections in the auxiliary fittings of the printing machine, carried by the carriage itself, which it is not possible to test jointly with the printing cylinder. Further, in traditional proof presses, the test printing is limited to a test piece strip of only a few meters length, 6 meters at the most, or is effected directly to single sheets.

The present invention has the object of providing a apparatus for the testing of printing cylinders or similar cylinders which operate on web material, used, for example in rotogravure printing machines, in flexographic, offset, varnishing, coating and similar machines, in which not only the printing cylinder is tested, but also the whole cylinder assembly with its associated tools and fittings for the treatment of the web material, that is, the assembly which after testing will eventually be in the printing or like machine.

According to the invention, there is provided an apparatus for the testing of printing or like cylinders for operating on web material, comprising a framework carrying support means for supporting the cylinder for cooperation with an interchangeable counter-pressure roller mounted rotatably in the said framework, tools associated with the cylinder for treatment of the web, supported by said support means, means for conveying the web including a table over which the web is fed to the cylinder under test, and means for discharging the web after it has passed between said cylinder and said counter-pressure roller.

In carrying out the testing of a cylinder by means of the apparatus of the invention the conditions which occur in the printing or similar machine during normal production working are simulated completely: the same tools for the treatment of the web material (such as doctor blades, pumps, inkers and filters) which will operate in the machine itself operate on the cylinder in the testing apparatus, avoiding subsequent and expensive halting of the machine in production. Since the counter-pressure roller is interchangeable, a pressure roller of the same diameter and of the same hardness as that of the printing or like machine can be used in the testing apparatus.

Testing is carried out on a web of material of any desired length.

Preferably the support means are adapted to support a carriage on which the cylinder to be tested is rotatably mounted, the carriage being provided with the said tools.

In a preferred embodiment of the invention the discharge means comprise an endless conveyor belt for drawing the web and the feed table is provided with means for braking the web. Preferably the said conveyor belt is driven at a linear speed greater than the peripheral speed of the cylinder and of the counter-pressure roller. As a result the web is maintained taut and is not subjected to waviness or folding.

Preferably the conveyor belt is apertured for the passage of air, and a suction box is provided below the belt for drawing air through the belt in order to hold the web against the said belt. This characteristic has the advantage of enabling a web to be held taut even if the upper surface of the web is delicate and should not be subjected to contact with mechanical braking members.

According to a preferred characteristic of the invention the feed table is provided with an instrument for making a reference mark on the web. This enables a reference mark to be made on the web for example in cases where tests of successive colours have to be made with the object of obtaining precision registration in the printing machine. In addition, a telescope is preferably fixed to the framework to enable angular adjustment of the cylinder relative to a reference on the said cylinder. In practice a cross or other reference may be incised on the cylinder, with the same angular position for the incised cylinders used for printing the successive colours: by causing these reference points to coincide with a similar reference carried on the graticule of the telescope, which is in a fixed position, exact registration of the different printed colours can be achieved.

In a preferred embodiment of the invention, there is provided downstream of the discharge means a picking-up table for the treated web material. Preferably the picking-up table comprises an endless conveyor the linear speed of which is less than the linear speed of the discharge means.

The invention will now be further described, by way of non-limiting example, with reference to the accompanying drawings, in which.

Figure 1:
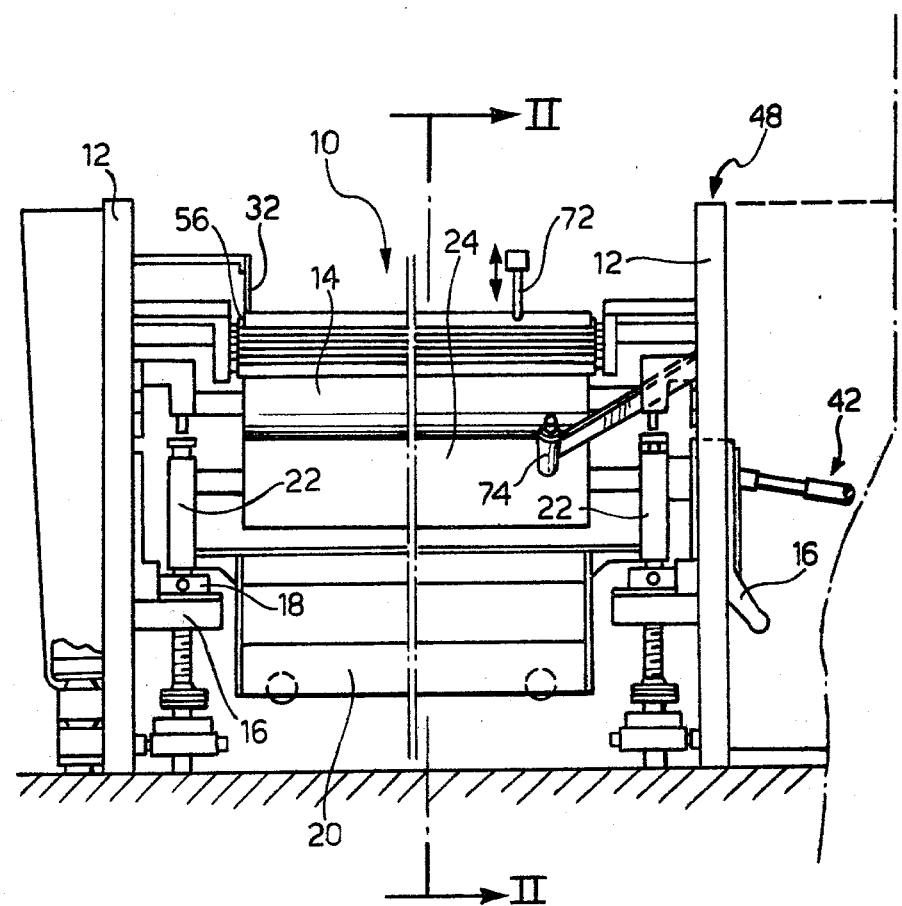
FIG. 1 is a diagrammatic front elevational view of an apparatus according to one embodiment of the invention.
Figure 2:
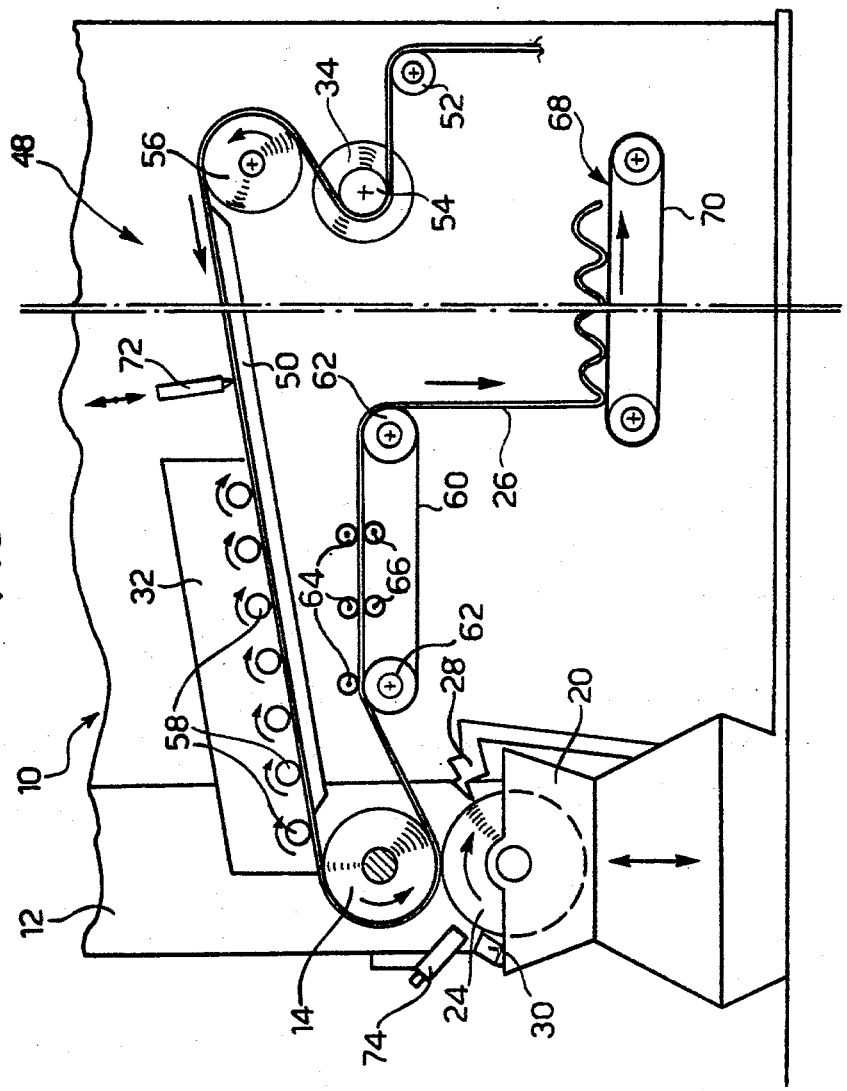
FIG. 2 is a diagrammatic longitudinal section taken on line II—II of FIG. 1, and FIGS. 3 and 4 are longitudinal sections similar to FIG. 2, showing variants of the embodiment of FIGS. 1 and 2.

With reference to FIGS. 1 and 2, a testing apparatus 10 according to the invention has two upright stanchions 12 between which a counter-pressure roller 14 is mounted interchangeably for rotation about a fixed horizontal axis. Each stanchion 12 has a guide, not shown, in which a bracket 16 is mounted for vertical displacement. The brackets 16 are provided with supports 18 for a carriage 20.

The carriage 20, of known type, has two vertical shoulders 22 between which a printing cylinder 24 to be tested is mounted rotatably. The lower ends of the two shoulders 22 are supported removably by the two supports 18. The carriage 20 is provided with all the definitive tools necessary to print a web 26 of material such as, for example, an inker 28, a doctor blade 30, a colour pump, splash guards, and filters.

Each of the two brackets 16 and the cylinder 24 and the carriage 20 supported thereby is movable vertically relative to the counter-pressure roller 14 by means of a transmission chain driven by one or more motors (not shown) which do not form part of the present invention.

Rotary drive is transmitted to the printing cylinder 24 to be tested by means of a cardan transmission 42 from a motor (not shown) which does not form part of the invention.

As illustrated in FIG. 2, the two upright stanchions 12 form a framework 48 which is provided with a feed table 50 for the feeding of the web 26. The counter-pressure roller 14 is downstream of the feed table 50, and upstream of the table 50 there are provided three feed rollers 52, 54 and 56 mounted in the framework 48. The feed roller 54 is provided, at one end, with a flange 34 for the lateral alignment of the web 26.

A series of parallel idle rollers 58 is mounted in the framework 48 above the table 50, the axes of rotation of the rollers 58 being coplanar and substantially parallel to the axis of the printing cylinder 24 to be tested. The rollers 58 are mounted so that they always maintain contact with the web 26 which passes over the feed table 50 to be advanced to the pressure roller 14. The rollers 58 thus act to brake the web 26, avoiding the formation of rucks or folds in the web 26 as it advances. The axes of the braking rollers 58 can be slewed in their common plane for the purpose of lightly pressing the one longitudinal edge of the web 26 against a fixed vertical guide wall 32 in order to obtain perfect lateral registration of the web 26.

Below the feed table 50 there are located means for discharging the web 26 comprising an endless conveyor belt 60 of rubber which passes around two parallel rollers 62 one of which is rotatably driven a motor (not shown). Above the upper run of the conveyor belt 60 pressure rollers 64 are provided with their axes coplanar to maintain the discharged web 26 firmly against the belt 60. Below the said upper or working branch of the belt 60 there are provided two idle support rollers 66 associated with said respective pressure rollers 64. The conveyor belt 60 is driven at a linear speed slightly in excess of the peripheral speed of the cylinder 24 and of the counter pressure roller 14.

Downstream of the conveyor belt 60 a web-bunching table 68 is located. The bunching table 68 is formed by an endless conveyor belt 70 having a linear speed which is less than that of the conveyor belt 60, so as to form a succession of rucks or folds in the web 26 fed to the conveyor belt 70.

A marker instrument 72 is mounted above the feed table 50 to incise a reference mark on the web 26. The marker instrument may be of any known type and may, for example, comprise a punch. Downstream of the instrument 72 a telescope 74 is fixed to the framework 48. The telescope 74 enables angular adjustment of the cylinder 24 to be tested relative to a reference marker such as a cross or circle incised on the cylinder 24.

The operation of the apparatus 10 described and illustrated in FIGS. 1 and 2 will now be described.

A web 26 is first rested on the feed table 50, threaded beneath the rollers 58, wound around the counter-pressure roller 14 and pinched between conveyor belt 60 and the pressure rollers 64. The rubber conveyor belt 60 is driven at a speed greater than that of the printing cylinder 24 and its cooperating counter-pressure roller 14, but the pull exerted on the web 26 by the conveyor belt 60 is less than the braking force exerted on the web 26 by the rollers 58, so that the web 26, while remaining taut, is not advanced by the conveyor belt 60, which simply slides beneath the web 26.

With the web 26 thus stretched, a reference mark is made upon the web by the instrument 72. This mark acts as a reference in a successive colour testing operation. At this point the carriage 20 carrying the printing cylinder 24 to be tested is placed on the supports 18 of the apparatus 10. With the conveyor belt 60 already in motion, the carriage 20 is raised by means of the two vertically movable brackets 16, the carriage being halted when the cylinder 24 is spaced a few millimeters from counter-pressure roller 14 by means of stop blocks (not shown).

A sighting is now taken through the telescope 74 and the printing cylinder 24 is rotated until a cross or other reference made on the cylinder 24 for the registration of different colours in course of colour printing comes into exact coincidence with a similar cross or other reference carried by a graticule in the telescope 74. When such coincidence has been obtained, the carriage 20 is advanced further towards the counter-pressure roller 14, stopping at a predetermined point which corresponds to a desired and preset pressure between the roller 14 and the printing cylinder 24.

At this stage the testing apparatus 10 is set in movement at the predetermined operating speed, the pull imparted to the web 26 by printing cylinder 24 overcoming the resistance of the braking rollers 58 so that the web 26 is printed while remaining stretched. The printed web 26 collects upon the conveyor belt 70, which moves more slowly than the peripheral speed of the printing cylinder 24, gathering up the web 26.

With the first colour thus printed, one proceeds in similar fashion to print successive colours, taking care to align the reference mark, traced or imprinted onto the web 26 by the instrument 72, and the reference marks of the successive printing cylinders 24 for the various colours, with the cross or reference carried by the telescope 74.

In the variant illustrated in FIG. 3, the feed table 50 is situated below the conveyor belt 60. This arrangement has the advantage that the web 26, after having been printed, is taken above the level of the printing cylinder 24. In place of the pressure rollers 64 on the conveyor belt 60 which receives the printed web 26 the conveyor belt 60 is provided with a suction box 86 located beneath the upper working run of belt 60, the latter having apertures through which air can pass. The suction applied to the conveyor belt 60 maintains the web 26 adhered to the belt 60.

The feed table 50 is also apertured and is provided with a suction box 36 placed below the table 50 itself, in place of the braking rollers 58, in order to ensure adherence of the web 26 to the table 50 as the web is drawn from a roll rotatably supported upon an unwinding stand 38. The table 50 may be replaced by a rubber or similar belt provided with small holes and placed over the suction box 36.

The printed web 26 is discharged by the conveyor belt 60 towards a winding stand for the treated web.

In the variant illustrated in FIG. 4, the web 26 which has already been printed collects in a pick-up chute 88 from which the web 26 may be fed again to the feed table 50 to carry out successive printings in other colours, as indicated by a broken line in FIG. 4. The feed table 50 may be located below the level of the machine operative's footboard.

In the examples described and illustrated in the drawings carriage supports 18 are vertically displaceable in opposite directions relative to the counter-pressure roller 14. The lateral supports of the counter-pressure roller 14, rather than being fixed, may be supported by elastically flexible members in the radial direction of counter-pressure roller 14, as described and illustrated in more detail in the Applicant's Patent Application 69528-A/76. By such means, the same working pressure can be obtained as will subsequently be used in production on the printing machine itself, or any other working pressure, according to the operative's choice, according to the specific testing requirements.

The supports 18, in addition to supporting the shoulders 22 of the carriage 20, may be designed to receive and support cylinder support devices of any type as well as the single printing cylinder 24 to be mounted subsequently on the carriage 20.

Instead of supporting the printing cylinder 24 on vertically movable supports 18, the cylinder 24 may be supported by fixed supports and the counter-pressure roller 14 carried by vertically movable supports, so that the above described operations can be replaced by lifting and lowering of the counter-pressure roller 14.

The machine according to the invention is capable of testing, for example, working cylinders of various kinds and complete carriages with their associated working members enabling preliminary printing work such as proof taking and the formulation of colours to be carried out easily.

It will be understood that the details of construction and practical embodiments of the invention may be widely varied with regard to what has been described and illustrated, without nevertheless departing from the scope of the present invention.

What is claimed is:

1. Apparatus for the testing of printing or like cylinders for operating on web material comprising a framework, support means carried by said framework, a testable subassembly removably supported by said support means, said subassembly comprising a carriage removably supported by said support means, a cylinder to be tested rotatably mounted on said carriage and tool means supported by said carriage and operatively associated with said cylinder for treatment of the web, a counter pressure roller mounted rotatably and interchangeably in said framework, conveyor means for conveying the web including a table over which a web is fed to the cylinder under test and discharge means for discharging the web after it has passed between said cylinder and said counter pressure roller, said conveyor means and said discharge means being disposed one above the other on the same side of said counter pressure roller.

2. Apparatus as defined in claim 1, wherein the support means are displaceable towards the counter-pressure roller in opposite directions selectively.

3. Apparatus as defined in claim 1, wherein the counter-pressure roller is displaceable towards the cylinder to be tested in opposite directions selectively.

4. Apparatus as defined in claim 1, wherein the discharge means comprise an endless conveyor belt for drawing the web, the feed table being provided with means for braking the web.

5. Apparatus as defined in claim 4, wherein the said endless conveyor belt is driven at a linear speed greater than the peripheral speed of the cylinder and of the counter-pressure roller.

6. Apparatus as defined in claim 4, wherein pressure rollers are located above the conveyor belt to maintain the web in contact with the said belt.

7. Apparatus as defined in claim 4, wherein the conveyor belt is apertured for the passage of air, and including a suction box located below the belt for drawing air through the belt to hold the web against the said belt.

8. Apparatus as defined in claim 4, wherein the means for braking the web comprise a suction box located below the feed table, the latter being apertured for the passage of air.

9. Apparatus as defined in claim 1, wherein the feed table comprises a belt of rubber or like material and at least two rollers between which said belt is stretched.

10. Apparatus as defined in claim 4, wherein the means for braking the web comprise rollers in contact with the web the axes of said rollers being coplanar and substantially parallel to the axis of the cylinder under test.

11. Apparatus as defined in claim 10, wherein the axes of the rollers can be slewed in their common plane to displace the web laterally.

12. Apparatus as defined in claim 1, wherein the feed table is provided with an instrument for making a reference mark on the web.

13. Apparatus as defined in claim 1, including a telescope fixed to the framework to enable angular adjustment of the cylinder relative to a reference on the said cylinder.

14. Apparatus as defined in claim 1, wherein downstream of the discharge means there is provided a picking-up table for the treated web material.

15. Apparatus as defined in claim 14, wherein the picking-up table comprises an endless conveyor the linear speed of which is less than the linear speed of the discharge means.

16. Apparatus as defined in claim 14, wherein downstream of the picking-up table means are provided for the reinsertion of the treated web onto the feed table.

17. Apparatus as defined in claim 1, wherein at least one of the feed table and the discharge means are carried cantilever-fashion by uprights of framework.

18. Apparatus as defined in claim 1, including an unwinder coupled to the feed table for unwinding the coiled web and a winder coupled to the discharge means for winding the treated web.

* * * * *